United States Patent [19]

Studniarz et al.

[11] Patent Number: 4,724,600

[45] Date of Patent: Feb. 16, 1988

[54] METHOD OF MAKING A HIGH VOLTAGE DYNAMOELECTRIC MACHINE WITH SELECTIVELY INCREASED COIL TURN-TO-TURN INSULATION STRENGTH

[75] Inventors: Stanley A. Studniarz, Murrysville Boro, Pa.; John C. Botts, Hilton Head Island, S.C.; John S. Johnson, Murrysville Boro, Pa.

[73] Assignee: Westinghouse Electric Corp., Pittsburgh, Pa.

[21] Appl. No.: 889,996

[22] Filed: Jul. 28, 1986

Related U.S. Application Data

[62] Division of Ser. No. 723,775, Apr. 16, 1985, Pat. No. 4,634,911.

[51] Int. Cl.[4] ............................................. H02K 15/06
[52] U.S. Cl. ..................................... 29/596; 310/45; 310/208; 310/215
[58] Field of Search ................... 29/596, 605; 310/43, 310/45, 214, 215, 208; 336/209

[56] References Cited

U.S. PATENT DOCUMENTS

| | | |
|---|---|---|
| 1,685,722 | 9/1928 | Parsons et al. |
| 2,173,726 | 9/1939 | Prindle . |
| 2,201,845 | 5/1940 | Wieseman ........................ 310/208 |
| 2,613,238 | 10/1952 | Wieseman ........................ 310/215 |
| 2,679,925 | 7/1972 | Fort . |
| 2,975,088 | 3/1961 | Rossman et al. . |
| 4,001,616 | 1/1977 | Lonseth et al. ........................ 310/45 |
| 4,137,471 | 1/1979 | Sato et al. ........................ 310/45 |
| 4,365,177 | 12/1982 | Madsen . |

FOREIGN PATENT DOCUMENTS

| | | |
|---|---|---|
| 1053091 | of 1959 | Fed. Rep. of Germany . |
| 2208029 | of 1973 | Fed. Rep. of Germany . |
| 2342168 | of 1975 | Fed. Rep. of Germany . |
| 55-83434 | of 1980 | Japan . |
| 0036146 | 3/1983 | Japan . |
| 0043151 | 3/1983 | Japan . |
| 1048873 | 10/1931 | Switzerland . |
| 0407304 | 2/1966 | Switzerland . |
| 312217 | of 1929 | United Kingdom . |
| 379901 | of 1932 | United Kingdom . |
| 600907 | of 1948 | United Kingdom . |
| 0141925 | 3/1960 | U.S.S.R. . |

Primary Examiner—Carl E. Hall
Attorney, Agent, or Firm—G. H. Telfer

[57] ABSTRACT

Multiple turn coils are arranged with turn insulation around individual turns, group insulation around each of a plurality of groups of turns, and ground insulation around the entire coil half. This arrangement protects against a potential discharge between turns upon occurrence of a steep front impulse voltage.

3 Claims, 3 Drawing Figures

METHOD OF MAKING A HIGH VOLTAGE DYNAMOELECTRIC MACHINE WITH SELECTIVELY INCREASED COIL TURN-TO-TURN INSULATION STRENGTH

This is a division of application Ser. No. 723,775 filed Apr. 16, 1985 now U.S. Pat. No. 4,634,911, issued Jan. 6, 1987.

BACKGROUND AND SUMMARY OF THE INVENTION

This invention relates to dynamoelectric machines such as large AC induction or synchronous motors with multiple turn coils. The invention may also be applied to other machines, such as turbine generators and waterwheel generators, with multi-turn windings.

In dynamoelectric machines, coils are placed in slots in a magnetic core. The coils are made up of a number of turns and the coil turns in a slot are insulated from each other and from the adjacent core. In a large machine, such as a motor of at least several thousand horsepower rating, the coil turns with their individual turn insulation are usually stacked one on top of another in a coil slot and the entire number of coil turns in the slot for a particular coil are further covered with ground wall insulation for insurance against a conductive path occurring between any of the turns and the adjacent core.

An insulation system for such motors may use various types of insulating materials. One example for high voltage applications is epoxy resin impregnated mica paper used for both the turn insulation and for the ground wall insulation. Machines having such insulation systems have long been successfully used. There are, however, some occurrences of failure of such machines due to abnormal transient events on the power system with which the machine and its coils are connected. This may happen when a voltage is abruptly applied to the machine. This condition is referred to as a steep front impulse, such as one having a rise time to the full magnitude of the applied voltage of about 0.1 to 0.3 microsecond. In such an instance, there is a brief time in which different turns of a single coil may be at significantly different electrical potential. If the voltage difference is great enough, there can be a breakdown or discharge between the involved conductors leading to destruction of the insulation. The voltage can reach about 40 KV or higher where the normal line voltage is about 14 KV and surges are anticipated to reach some multiple of that voltage.

The present invention has to do with a machine having coil turns arranged in combination with an insulation system that selectively increases the turn-to-turn insulation strength. That is, by this invention, it is not merely the case that the insulation strength is increased by greater thickness of insulating material or improved insulating material on each of the conductors but rather by interposing additional insulating material between conductors that are subject to the breakdown phenomenon. The selectivity in applying the additional insulation is important so it requires essentially no redesign of motors as far as conductor size or slot size is concerned. In one aspect, therefore, the invention has to do with the provision in an existing coil slot design of conductors with an insulation system that substantially prevents the occurrence of breakdown between coil turns that may be of widely different voltages due to a steep front impulse voltage.

Tests of coils have been conducted that have been constructed in accordance with the above description of prior art in which there is individual turn insulation and ground wall insulation. Steep front impulse voltages were applied with increasing voltage magnitude in successive applications until failure of the insulation. The coils were dissected and the location of the breakdown determined. In machines of a design that has been widely used in large motors, such as some of 11,000 horsepower, which include coil turns numbering about six in a coil slot in a linear stack, it was found that the coils failed ultimately turn-to-turn, that is, there was no instance of failure between a coil turn and the core. However, the failures did not occur between adjacent turns since the voltage between adjacent turns apparently is not high enough to puncture the turn insulation. Instead, the turn-to-turn failure was between the highest voltage turn, such as the first turn of the stack, and the lowest voltage turn, such as the last turn of the stack or the ground turn. What appeared from examination of the coils was that the discharges propagated from the first conductor through its turn insulation and along a path between the turn insulation of the subsequent turns and the ground wall insulation until reaching the ground turn whose turn insulation was also punctured. As the discharge propagates towards the ground turn, the voltage across the turn insulation increases in the absence of any appreciable voltage drop in the discharge.

An insulation material such as epoxy resin impregnated mica paper can itself have a very high insulation strength making a discharge difficult to propagate through it. However, in systems as described in which a ground wall insulation of such material is wrapped and processed around a stack of coil turns that each have individual turn insulation, it appears likely from the tests conducted that the minor voids and cavities between the ground wall insulation and the turn insulation facilitate the propagation of the discharge. Such voids and cavities would not normally be considered to make the insulation system defective and their elimination in the manufacturing process would be a substantial expense.

The present invention will substantially eliminate the type of failures referred to. Briefly, in accordance with the present invention, in a given coil slot and conductor configuration, the insulation system is modified to include three significant parts rather than the two part system as was previously used on these machines. In addition to the turn insulation and the ground wall insulation, an additional layer of insulation encompasses groups of coils of the coil stack. For example, the coil turns may be simply divided into two groups, each of roughly half of the coil turns, and that group of turns with its individually insulated conductors is covered by its own layer of insulation, here referred to as group insulation, so that each of the turns of a group are further insulated from each of the turns of the other group by the material and thickness of the group insulation.

It is significant that the addition to the insulation system of the group insulation is provided by the present invention without requiring wider dimensioned coil slots. This result occurs because the final ground wall insulation is simply made thinner in order to accommodate the group insulation. This still provides, assuming all the materials are of the same quality in each part of the insulation system, the same amount of insulation between each coil turn and the core. A minor addition to the dimensional height of the coils and their insulation occurs as a result of the two additional layers, one on each group, of group insulation that is interposed between the two groups of coil turns. However, this variation in height as opposed to prior machines can be readily accommodated by adjustment of the dimensions of spacers or wedges that are employed at the slot opening to tightly close the slot and fill the space therein.

Wieseman U.S. Pat. No. 2,201,845, May 21, 1940, is of some interest as background to the present invention. It is directed to coil conductors with turn insulation and ground wall insulation plus additional layers of insulation (e.g. 27, 29, 31 in FIG. 4 of said patent) interposed respectively between adjacent turns, with increasing thickness of the additional layers. However, conventional manufacturing processes will, in such a structure, leave minor voids and cavities between the turn insulation and the ground wall insulation and also between the edges of the additional layers of insulation and the ground wall insulation. Consequently, the arrangement of the patent is not regarded as effective in avoiding steep front impulse breakdown. In contrast, by the present invention, any discharge would have to penetrate through both the turn insulation and the group insulation. If it merely penetrates through the turn insulation, there is not a path along which it could propagate to the turn insulation of another conductor.

That is, while the arrangement of the patent alters the capacitance between turns and provides an increased creepage path along the interface between the turn insulation and ground insulation, it does not provide a positive dielectric barrier to voltage as does applicants' group insulation.

DESCRIPTION OF THE PREFERRED EMBODIMENTS

Figure 1:
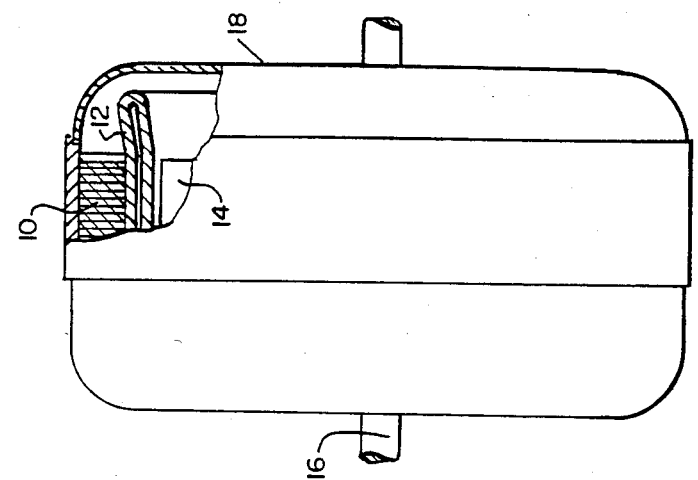
FIG. 1 is a generalized view, partly broken away, of a dynamoelectric machine having a stator core in which the present invention is advantageously used.

Referring to FIG. 1, a dynamoelectric machine is shown including a stator core 10 having a plurality of coil slots extending from the inner periphery of the substantially cylindrical stator core. Each of the coil slots has a coil 12 of a plurality of conductive turns therein. The machine has a rotor 14, within the stator 10, mounted on a bearing supported shaft 16. A frame 18 encloses the stator 10 and rotor 14. The machine may be a three-phase induction or synchronous motor, for example. The coil winding arrangement may be as has been used previously. Generally each slot contains two distinct half coils and coil end turns complete the coil winding from a half coil in one slot to another coil half in another slot. An individual coil has a plurality of turns so the current path continues from one half coil to another several times. The present invention is to ensure the integrity of the insulation within an individual half-coil, particularly when a steep front impulse voltage is applied so there is a large voltage difference between turns.

Figure 2:
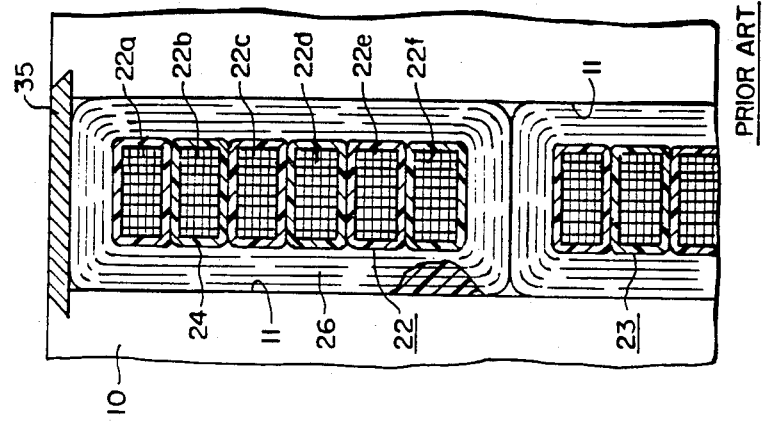
FIG. 2 is a cross-sectional view of a single coil with an insulation system in accordance with the prior art.

FIG. 2 illustrates the prior art construction in which two half-coils 22 and 23, each of several conductors such as 22a through 22f, are stacked in a coil slot 11. Each conductor 22a through 22f has a layer of individual turn insulation 24 and the stack of insulated turns has ground wall insulation 26 around them. The other half-coil 23 in slot 11 is similarly arranged and insulated. Wedge 35 closes the opening of slot 11.

Figure 3:
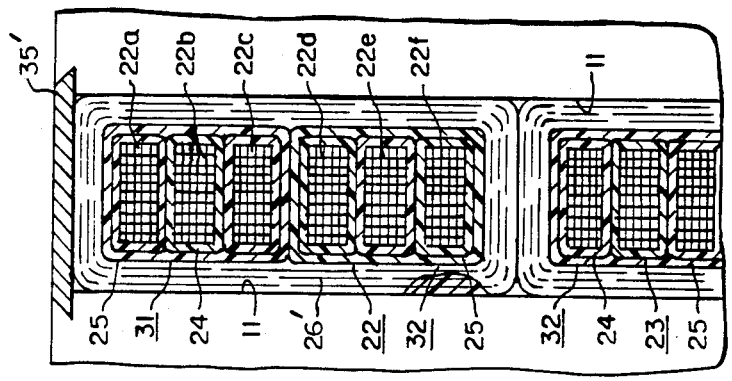
FIG. 3 is a cross-sectional view of a single coil with an insulation system in accordance with the present invention.

In accordance with the new construction system and method of the present invention as illustrated in FIG. 3, there is first applied turn insulation 24 as heretofore to the individual turns 22a-22f of a coil. Then there is applied to groups of turns, in this instance two groups 31 and 32 of three turns each, a layer of group insulation 25. The insulated groups 31 ad 32 are arranged in a stack and ground wall insulation 26' is applied around them.

In contrast to the former construction of FIG. 2, it is seen that there are three significant parts of the insulation system of each individual coil-half. These include group insulation 25 that is in addition to the turn insulation and the ground wall insulation as used heretofore.

By way of example, the insulation system may be constructed of epoxy resin impregnated mica paper tape and the individual wrapping procedures and curing may be in accordance with prior known practice. What is significant here is the advantage gained in increased turn-to-turn insulation strength between the top coil turn 22a and the bottom coil turn 22f, or between any turns of the top group 31 and those of the bottom group 32, by virtue of a rearrangement of the insulation. In the prior construction of FIG. 2, there may be used, for example, a mica paper turn insulation 24 of a thickness of 0.018 inch (0.46 mm.) and a mica paper ground wall insulation of 0.102 inch (2.59 mm.). Consequently between each individual turn and the core, there is an insulation thickness of 0.120 inch (3.05 mm.) and between adjacent turns there is an amount of insulation of 0.036 inch (0.92 mm.) or twice the individual turn insulation.

In the new construction, with the same conductor size and slot size, the arrangement can be made in which the turn insulation 24 remains the same, namely, 0.018 inch (0.46 mm.) on each turn. (All dimensions given are by way of example.) The additional group insulation can be provided by 0.012 inch (0.30 mm.) of the same type of insulation. To accommodate the group insulation, the final ground wall insulation is wrapped to a thickness of just 0.090 inch (2.29 mm.). This results in an arrangement that has the same amount of insulation, 0.120 inch (3.05 mm.), between each turn and the core consequently requiring no variation in slot width. There is also the same amount of insulation equal to 0.036 inch (0.92 mm.) between adjacent turns within a single group of turns. Now, however, there is an additional amount of insulation equal to two thicknesses of the group insulation or 0.024 inch (0.61 mm.) between each of the turns of the top group 31 and each of the turns of the bottom group 32. It is this additional amount of insulation that will protect against the type of failure previously discussed as there is much less opportunity for propagation of a discharge between the turn insulation and the ground wall insulation and any discharge that may have a tendency to form must be of a magnitude sufficient to penetrate the two additional thicknesses of group insulation.

While the width dimension of the insulated coil can be made the same as formerly, there is an increase in the vertical dimension. In the example given, this is equal to 0.024 inch (0.61 mm.) per half-coil (that is four times the group insulation thickness minus two times the reduction in thickness of the ground wall insulation). The coil slot must therefore accommodate an additional 0.048 inch (1.22 mm.) for the two half-coils in a slot. This can be easily done by selection of a reduced thickness wedge 35' closing the slot.

As shown in FIG. 3, coil slot 11, which is one of the plurality of coil slots of the core 10, has a substantially rectangular cross-section. Also, the individual coil turns 22a–22f, coil groups 31 and 32, and the assembled stack of turns 22a–22f with turn insulation 24, group insulation 25 and ground wall insulation 26' each have a substantially rectangular cross-section. They, along with the other half-coil 23 and its insulation system, substantially fill the coil slot 11.

It is therefore seen that by rearrangement of an insulation system for multi-turn coils that a high degree of protection is provided without requiring change of slot size or conductor size. While the present invention has been shown and described in a few forms only, it will be apparent that various modifications may be made consistent with the teachings herein.

We claim:

1. A method of making a high voltage dynamoelectric machine with at least one half-coil of coil turns in a stack in each of a plurality of coil slots so there is reduced risk of turn-to-turn insulation breakdown between first and last coil turns of the stack of a given half-coil, comprising:

applying individual turn insulation to each of said coil turns;

applying group insulation about each of a plurality of groups of said coil turns having said turn insulation thereon;

applying ground wall insulation about said plurality of groups of coil turns, having said group insulation thereon, assembled together into a stack in which a top one of said coil turns and a bottom one of said coil turns are in separate ones of said groups;

inserting said stack having said ground wall insulation into a coil slot.

2. A method of making a high voltage dynamoelectric machine in accordance with claim 1 wherein:

the applying of said turn insulation, said group insulation, and said ground wall insulation each comprises wrapping layers of a resin impregnated mica paper insulation.

3. A method of making a high voltage dynamoelectric machine in accordance with claim 1 wherein:

each of said turn insulation, said group insulation, and said ground wall insulation are applied to respective substantially uniform thicknesses and the thicknesses are chosen so the width of said stack, after application of said turn, group, and ground wall insulation, is substantially equal to the width of said coil slot.

* * * * *